March 5, 1946. H. E. KALLMANN 2,396,049
TROLLEY WITH MULTICONTACT HEAD FOR TRACKLESS TROLLEY-FED VEHICLES
Filed Dec. 1, 1943 2 Sheets-Sheet 2
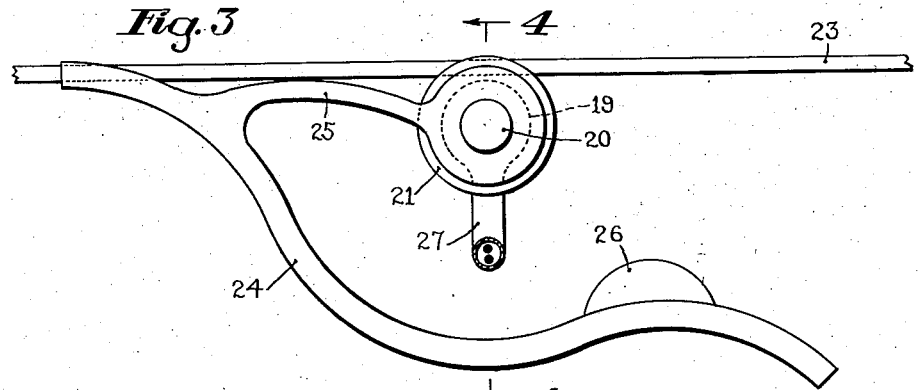
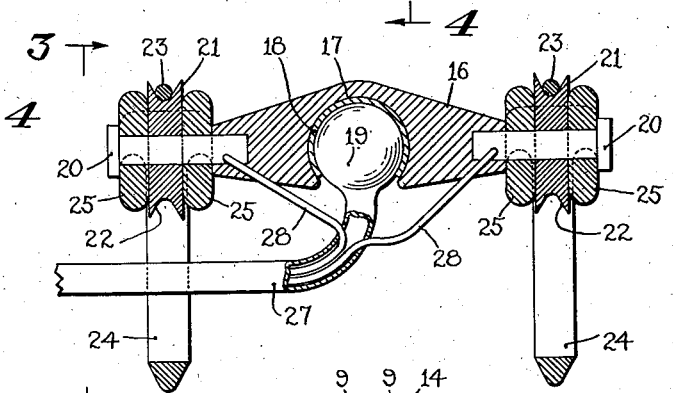
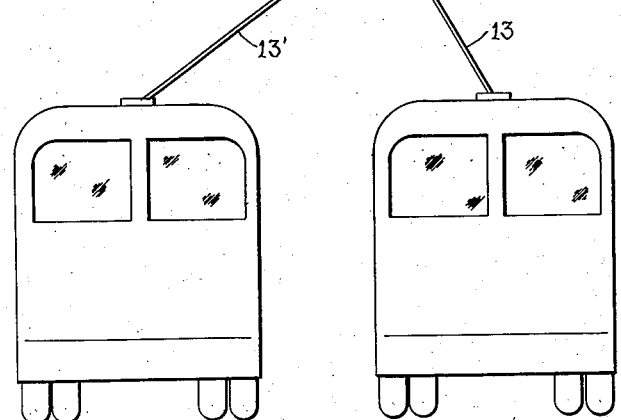
Inventor
Heinz E. Kallmann
by Charles E. Ruby
his Attorney Patented Mar. 5, 1946

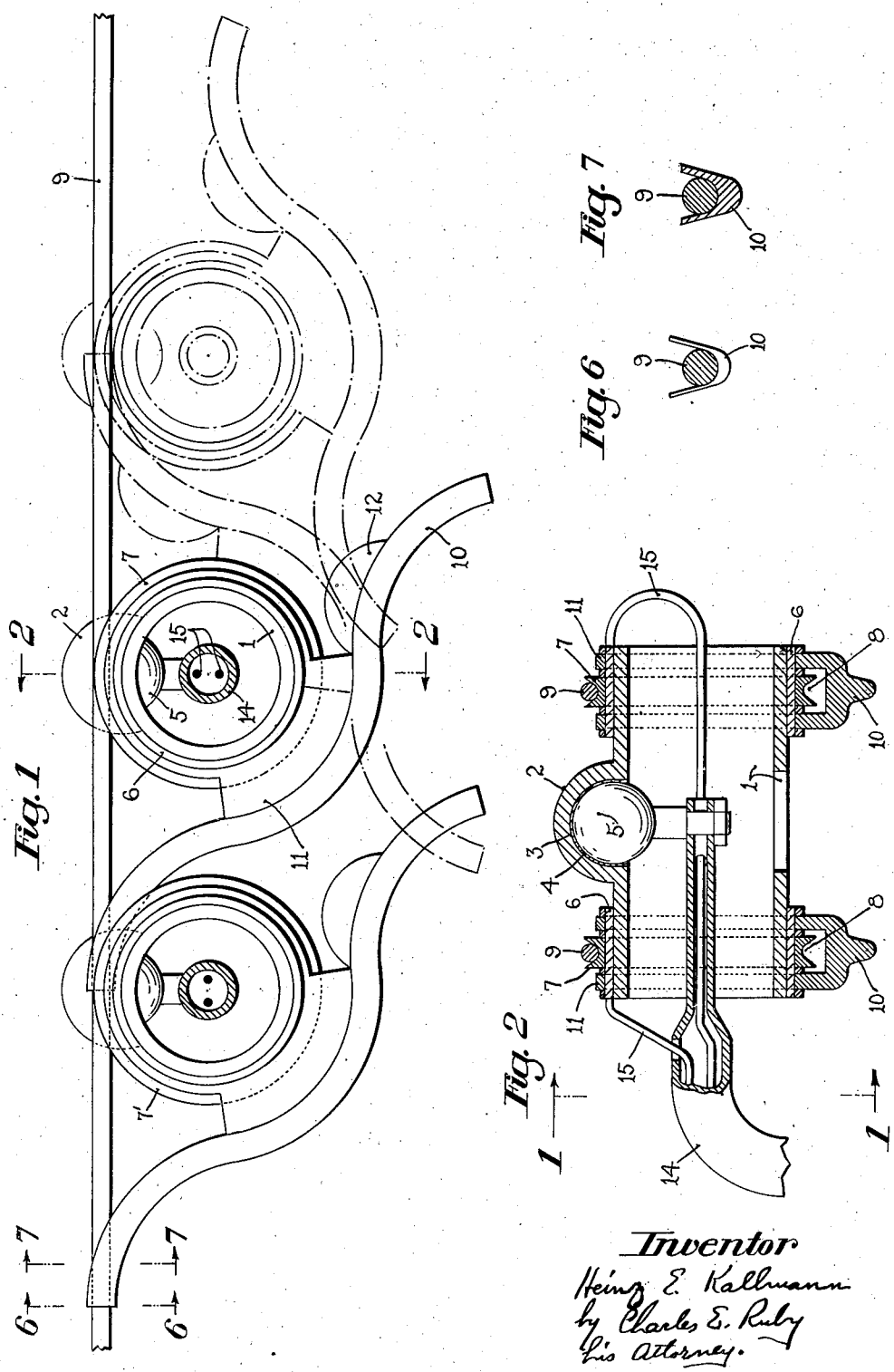

2,396,049

UNITED STATES PATENT OFFICE 2,396,049

TROLLEY WITH MULTICONTACT HEAD FOR TRACKLESS TROLLEY-FED VEHICLES

Heinz E. Kallmann, Boston, Mass.

Application December 1, 1943, Serial No. 512,422

15 Claims. (Cl. 191—51)

The present invention relates to trolleys with contact heads as used on trackless trolley-fed vehicles, more particularly to trolleys with multi-contact heads for trackless trolley-fed vehicles, and specifically to trolleys with multi-contact heads which permit trackless trolley-fed vehicles to overtake and pass one another. By "trackless trolley-fed vehicles" are meant trackless vehicles which take electrical power from one or more wires suspended along their routes. A common form of trackless trolley-fed vehicle is the "trolley bus"; and this term will be employed hereinafter to signify "trackless trolley-fed vehicles" in the widest sense of that term. Such trolley buses combine the advantages of electric drive, such as minimized weight, heat, noise and odor, with most of the desirable features of combustion-motor-driven vehicles in that they require no tracks and are thus able to meet passengers at the curb. However, hitherto a major obstacle to their use for dense traffic has been their inability to overtake and pass one another without laborious manipulations of their trolleys.

The principal object of the present invention is to provide a trolley for trolley buses which will enable trolley buses therewith provided to overtake and pass one another at any point along their line of travel at any speed without requiring that any attention be given to their trolleys.

Another object of the present invention is to provide a trolley for trolley buses having a multi-contact head capable of by-passing around itself a similar multi-contact head of an overtaking and passing trolley.

Another object of the present invention is to provide a trolley for trolley buses having a multi-contact head capable of by-passing around itself a similar multi-contact head of an overtaking and passing trolley without interruption in the supply of electrical power to either of the trolleys.

Another object of the present invention is to provide a trolley for trolley buses having a multi-contact head of the character described which can be used in conjunction with electrical power supply lines as presently constituted.

Another object of the present invention is to provide a trolley for trolley buses having a multi-contact head of the character described, by the use of which all of the advantages of the presently employed types of trolleys are realized and the advantage is added that trolley buses so provided can overtake and pass one another at any point along their route.

These and other objects of the present invention and its advantages will be fully understood from the following description, together with the accompanying drawings wherein like numerals indicate like parts and wherein:

Fig. 1 is a side elevation of two multi-contact trolley heads in sequence, one of which is shown in dot-and-dash lines in a second position, wherein the supporting members connecting the multi-contact trolley heads with the shafts of the trolleys are sectioned by a plane parallel to the multi-contact trolley heads along the line 1, 1, of Fig. 2.

Fig. 2 is a vertical section of the multi-contact trolley head, centrally located in Fig. 1, along the line 2, 2, of Fig. 1.

Fig. 3 is a side elevation of another embodiment of the multi-contact trolley head, wherein the supporting member connecting the multi-contact trolley head with the shaft of the trolley is sectioned by a plane parallel to the multi-contact trolley head along the line 3, 3, of Fig. 4.

Fig. 4 is a vertical section of the multi-contact trolley head, shown in Fig. 3, along the line 4, 4, of Fig. 3.

Fig. 5 is a rear view of two trolley buses provided with embodiments of the present invention, wherein the left trolley bus is overtaking and passing the right trolley bus, and wherein are shown, in particular, the dispositions of the two trolleys and their multi-contact trolley heads during such overtaking and passing of the right trolley bus by the left trolley bus.

Fig. 6 is a vertical view of one of the elements of the present invention, taken along the line 6, 6, of Fig. 1.

Fig. 7 is a vertical section of one of the elements of the present invention, taken along the line 7, 7, of Fig. 1.

In Figs. 1 and 2, 1 designates the body of the multi-contact trolley head, essentially a hollow yoke composed in parts of insulating material and formed with a protuberance 2 to provide a recess for the socket 3 of a ball-and-socket joint, the socket 3 being provided with a lining 4 suitable to serve as a bearing surface for the ball 5. On the outer surfaces of the end portions of the body 1 are secured suitable structures 6, 6, to serve as, or to support, bearing surfaces for the contact elements 7, 7, and the contact-element bypassing means. The contact elements shown in Figs. 1 and 2 consist of the trolley wheels 7, 7, each provided with grooves 8, 8, wherein to receive the electrical feed lines 9, 9. The bearings upon which these trolley wheels 7, 7, rotate upon the structures 6, 6, may consist of any suitable type of journal, pin or roller bearings. Also rotatable upon the structures 6, 6, by the use of any suitable type of bearings are the contact-element bypassing means. These consist of the curved conducting members 10, 10, each mounted on the end of one of the arms 11, 11, which, in turn, are mounted rotatably at their other ends upon the structures 6, 6. As shown in Figs. 1 and 2, these curved conducting members 10, 10, have preferably two points of inflection, and, as shown in Fig. 1, only one of the two ends of each of these curved conducting members 10, 10, contacts an electrical feed line at a time. During ordinary operation of the trolley with multi-contact trolley head, only the rear end of each of these curved conducting members 10, 10, will be in contact with a feed line, its front end being weighed down by its greater length and/or by the weight 12, but it may swing around upon its bearing on the body 1 forward so as to make contact with the feed line at its front end. The shape of these curved conducting members 10, 10, will be discussed in further detail in the description of their operation as contact-element bypassing means during the passing of one trolley bus by another trolley bus.

The multi-contact trolley head is connected to the shaft 13 of the trolley by means of the supporting member 14, which passes through one of the trolley wheels 7, 7. Upon the end of the supporting member 14 is mounted the ball 5, fitting into the socket 3 of the body 1. The supporting member 14 and the shaft 13 of the trolley may serve as conduits for the conductors 15, 15, taking electrical current from the trolley wheels 7, 7; but it is to be noted that whether the conductors 15, 15, are placed within or without the supporting member 14 and the shaft 13 of the trolley, at least one of the conductors 15, 15, passes through a trolley wheel other than the trolley wheel wherewith it is in electrical connection. The multi-contact trolley head shown in Figs. 1 and 2 is pivoted upon the supporting member 14 of the trolley, and thus may swivel with three degrees of freedom. Thus both contacting trolley wheels will, at all times, be pressed against their feed lines with equal pressures for all positions of the trolley bus relative to its feed lines.

In this described embodiment of the present invention, the length and the internal diameter of the hollow body 1 are so proportioned as to permit the supporting member 14 to swing horizontally and vertically far enough to enable the trolley bus to travel anywhere between the center of the street and its curb.

In Figs. 3 and 4, the essentially yoke-like body 16, of the multi-contact trolley head, may be composed partly or wholly of insulating material. Its center is formed with an essentially hemispherical recess 17 providing the socket of a ball-and-socket joint, the recess 17 being fitted with a lining suitable to serve as a bearing surface for the ball 19. In the end portions of the yoke-like body 16 are secured suitable structures 20, 20, to serve as, or to support, bearing surfaces for the contact elements and the contact-element bypassing means of the multi-contact trolley head. The contact elements shown in Figs. 3 and 4 consist of the small trolley wheels 21, 21, provided with suitable grooves 22, 22, wherein to receive the electrical feed lines 23, 23. The bearings upon which these trolley wheels 21, 21, rotate upon the structures 20, 20, may consist of any suitable type of journal, pin or roller bearings. Also rotatable upon the structures 20, 20, by the use of any suitable type of bearing are the contact-element bypassing means, which consist of the curved conducting members 24, 24, each mounted rigidly on the end of one of the arms 25, 25, which, in turn, are mounted rotatably at their other ends upon the structures 20, 20. As shown in Figs. 3 and 4, these curved conducting members 24, 24, have preferably two points of inflection, and, as shown in Fig. 3, only one of the two ends of each of these curved conducting members 24, 24, contacts an electrical feed line at a time. During ordinary operation of the trolley with multi-contact trolley head, only the rear end of each of these curved conducting members 24, 24, will be in contact with a feed line, its front end being weighed down by its greater length and/or by the weight 26, but it may swing around upon its bearing on the body 16 forward so as to make contact with the feed line at its front end. The shape of these curved conducting members 24, 24, will be discussed in further detail in the description of their operation as contact-element bypassing means during the passing of one trolley bus by another trolley bus.

The multi-contact trolley head is connected to the shaft 13 of the trolley by means of the supporting member 27, which passes below the body 16. Upon the top of the supporting member 27 is mounted the ball 19, fitting into the recess 17 of the body 16. The supporting member 27 and the shaft 13 may serve as conduits for the conductors 28, 28, taking electrical current from the trolley wheels 21, 21; but it is to be noted that whether the conductors 28, 28, are placed within or without the supporting member 27 and the shaft 13 of the trolley, at least one of the conductors 28, 28, connected to one of the trolley wheels 21, 21, passes between the feed line contacting the other trolley wheel and the bypath prescribed by the contact-element bypassing means associated with the other trolley wheel. The multi-contact trolley head shown in Figs. 3 and 4 is pivoted upon the supporting member 27 of the trolley and thus may swivel with three degrees of freedom. Thus both contacting trolley wheels will, at all times, be pressed against their feed lines with equal pressures for all positions of the trolley bus relative to its feed lines.

In this described embodiment of the present invention, the length of the yoke-like body 16 and the clearance between the trolley wheels 21, 21, and the curved conducting members 24, 24, are so proportioned as to permit the supporting member 27 to swing horizontally and vertically far enough to enable the trolley bus to travel anywhere between the center of the street and its curb.

The operation of the present invention can best be appreciated by consideration of Figs. 1 and 5. The overtaking trolley bus moves to the left of the trolley bus to be passed, as is shown in Fig. 5. Just before the overtaking trolley bus comes abreast of the trolley bus to be passed, the trolley wheels 7', 7', of the multi-contact trolley head of the overtaking trolley bus leave the electrical feed lines 9, 9, rolling down upon the curved conducting members 10, 10, of the multi-contact trolley head of the trolley bus to be passed, until they reach points at which the forward and upward forces exerted by the trolley wheels 7', 7', of the multi-contact trolley head of the overtaking trolley bus upon the curved conducting members 10, 10, of the multi-contact trolley head of the trolley bus to be passed cause these curved conducting members 10, 10, to swing forward and upward until their front ends are in contact with the electrical feed lines 9, 9; the trolley wheels 7', 7', of the multi-contact trolley head of the overtaking trolley bus continue to roll upon the curved conducting members 10, 10, of the multi-contact trolley head of the trolley bus to be passed, forward and upward, and finally back onto the electrical feed lines 9, 9. The rear ends of the curved conducting members 10', 10', of the multi-contact trolley head of the overtaking and passing trolley bus will glide from the electrical feed lines 9, 9, onto the curved conducting members 10, 10, of the multi-contact trolley head of the overtaken trolley bus, following their curvatures and thus swinging down temporarily as soon as they have passed the lowest points of the curved conducting members 10, 10, of the multi-contact trolley head of the overtaken trolley bus. In this manner, the trolley wheels 7', 7', of the multi-contact trolley head of the overtaking and passing trolley bus are bypassed around the trolley wheels 7, 7, of the multi-contact trolley head of the trolley bus overtaken and passed, but at no time is the electrical circuit of either of the two trolley buses interrupted. Small rolls (not shown) may be mounted in the front ends of the curved conducting members 10, 10, of the multi-contact trolley heads in order to attain rolling contacts and thus to minimize frictional forces. Furthermore, both ends of each of the curved conducting members 10, 10, of the multi-contact trolley heads may be provided with flaring grooves, as is shown in Figs. 6 and 7, the more readily to engage with the feed lines 9, 9. The curved conducting members 10, 10, of the multi-contact trolley heads are so shaped that when one multi-contact trolley head passes around another multi-contact trolley head, no jamming will occur: one example of such a shape of the curved conducting members 10, 10, is shown in the drawings, while a study of the geometrical problem involved will reveal numerous other suitable shapes capable of utilization.

It is manifest that, at the moment of overtaking and passing represented in Fig. 5, the two trolley buses are displaced laterally by at least their width. Thus the trolley shaft 13' of the overtaking and passing trolley bus is forced around its ball-and-socket joint, pointing further to the left, than the trolley shaft 13 of the overtaken trolley bus. Therefore, if these trolley shafts 13, 13' are properly curved, as, for example, they are in Fig. 5, the two identically shaped trolley shafts 13, 13' will not get into each other's way at any moment during the process of overtaking and passing one trolley bus by another trolley bus; nor will the supporting members 14, 14'.

In both of the embodiments of the present invention shown in Figs. 1 and 2 and in Figs. 3 and 4, a conductor connected to one of the two trolley wheels passes between the feed line contacting the other trolley wheel and the bypath prescribed by the contact-element bypassing means associated with the other trolley wheel.

It is obvious that many modifications in the construction of the trolley with multi-contact head for trolley-fed vehicles can be made without departing from the spirit and scope of the present invention. In particular, it is obvious that the present invention is not limited to embodiments designed for use with but two electrical feed lines, but may be utilized with three or more electrical feed lines. But whatever may be the form of construction used in substitution for the forms of construction disclosed and described in the embodiments presented, the present invention is to be limited only by the scopes of the appended claims.

Having thus described the present invention, I claim:

1. As a trolley for trolley-fed vehicles, in combination with a supporting shaft mounted on the vehicle, a trolley head comprising a body provided with a number of contact elements for contacting feed lines and a number of contact-element bypassing means carried by the body, supporting means carried by the supporting shaft and connected pivotally with the body at a point located between the contact elements, and conductors connected to the contact elements, one of which conductors passes between the feed line contacting a contact element connected to another of the conductors and the bypath prescribed by the contact-element bypassing means associated with that contact element.

2. As a trolley for trolley-fed vehicles, in combination with a supporting shaft mounted on the vehicle, a trolley head comprising a body provided with a number of contact elements for contacting feed lines and a number of contact-element bypassing means carried by the body, supporting means carried by the supporting shaft and connected pivotally with the body at a point located between the contact elements, and conductors connected to the contact elements, one of which conductors and the supporting means pass between the feed line contacting a contact element connected to another of the conductors and the bypath prescribed by the contact-element bypassing means associated with that contact element.

3. As a trolley for trolley-fed vehicles, in combination with a supporting shaft mounted on the vehicle, a trolley head comprising a body provided with a number of trolley wheels to engage with feed lines and a number of curved trolley wheel bypassing members carried by the body and whose ends alternatively are capable of contacting the feed lines in contact with the trolley wheels, supporting means carried by the supporting shaft and connected pivotally with the body at a point located between the trolley wheels, and conductors connected to the trolley wheels, one of which conductors passes between the feed line engaged by a trolley wheel connected to another of the conductors and the bypath prescribed by the curved trolley wheel bypassing member associated with that trolley wheel.

4. As a trolley for trolley-fed vehicles, in combination with a supporting shaft mounted on the vehicle, a trolley head comprising a body provided with a number of trolley wheels to engage with feed lines and a number of curved trolley wheel bypassing members carried by the body and whose ends alternatively are capable of contacting the feed lines in contact with the trolley wheels, supporting means carried by the supporting shaft and passing through one of the trolley wheels, and connected pivotally with the body at a point located between the trolley wheels, and conductors connected to the trolley wheels, one of which conductors passes between the feed line engaged by a trolley wheel connected to another of the conductors and the bypath prescribed by the curved trolley wheel bypassing member associated with that trolley wheel.

5. As a trolley for trolley-fed vehicles, in combination with a supporting shaft mounted on the vehicle, a trolley head comprising a body provided with a number of trolley wheels to engage with feed lines and a number of curved trolley wheel bypassing members mounted oscillatably upon the body and whose ends alternatively are capable of contacting the feed lines in contact with the trolley wheels, supporting means carried by the supporting shaft and passing through one of the trolley wheels, and connected pivotally with the body at a point located between the trolley wheels, and conductors connected to the trolley wheels, one of which conductors passes between the feed line engaged by a trolley wheel connected to another of the conductors and the bypath prescribed by the curved trolley wheel bypassing member associated with that trolley wheel.

6. As a trolley for trolley-fed vehicles, in combination with a supporting shaft mounted on the vehicle, a trolley head comprising a body provided with a number of contact elements for contacting feed lines and a number of contact-element bypassing means pivotally mounted for movement in the planes of the contact elements and provided with means normally maintaining the front ends of the contact-element bypassing means materially spaced from the feed lines, supporting means connecting the body with the supporting shaft, and conductors connected to the contact elements, one of which conductors passes between the feed line contacting a contact element connected to another of the conductors and the bypath prescribed by the contact-element bypassing means associated with that contact element.

7. As a trolley for trolley-fed vehicles, in combination with a supporting shaft mounted on the vehicle, a trolley head comprising a body provided with a number of contact elements for contacting feed lines and a number of contact-element bypassing means pivotally mounted for movement in the planes of the contact elements and provided with means normally maintaining the front ends of the contact-element bypassing means materially spaced from the feed lines, supporting means connecting the body with the supporting shaft, and conductors connected to the contact elements, one of which conductors and the supporting means pass between the feed line contacting a contact element connected to another of the conductors and the bypath prescribed by the contact-element bypassing means associated with that contact element.

8. As a trolley for trolley-fed vehicles, in combination with a supporting shaft mounted on the vehicle, a trolley head comprising a body provided with a number of contact elements for contacting feed lines and a number of contact-element bypassing means pivotally mounted for movement in the planes of the contact elements and provided with means normally maintaining the front ends of the contact-element bypassing means materially spaced from the feed lines, supporting means connecting pivotally the body with the supporting shaft, and conductors connected to the contact elements, one of which conductors passes between the feed line contacting a contact element connected to another of the conductors and the bypath prescribed by the contact-element bypassing means associated with that contact element.

9. As a trolley for trolley-fed vehicles, in combination with a supporting shaft mounted on the vehicle, a trolley head comprising a body provided with a number of contact elements for contacting feed lines and a number of contact-element bypassing means pivotally mounted for movement in the planes of the contact elements and provided with means normally maintaining the front ends of the contact-element bypassing means materially spaced from the feed lines, supporting means connecting pivotally the body with the supporting shaft, and conductors connected to the contact elements, one of which conductors and the supporting means pass between the feed line contacting a contact element connected to another of the conductors and the bypath prescribed by the contact-element bypassing means associated with that contact element.

10. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting the body with the supporting shaft, and conductors connected to the trolley wheels, one of which conductors passes between the feed line engaged by a trolley wheel connected to another of the conductors and the bypath prescribed by the curved trolley wheel bypassing member associated with that trolley wheel.

11. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting the body with the supporting shaft, and conductors connected to the trolley wheels, one of which conductors and the supporting means pass between the feed line engaged by a trolley wheel connected to another of the conductors and the bypath prescribed by the curved trolley wheel bypassing member associated with that trolley wheel.

12. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting the body with the supporting shaft and passing through one of the trolley wheels, and conductors connected to the trolley wheels, one of which conductors passes between the feed line engaged by a trolley wheel connected to another of the conductors and the bypath prescribed by the curved trolley wheel bypassing member associated with that trolley wheel.

13. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting the body with the supporting shaft, and conductors connected to the trolley wheels, one of which conductors and the supporting means pass through one of the trolley wheels.

14. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting pivotally the body with the supporting shaft, and conductors connected to the trolley wheels, one of which conductors passes between the feed lines engaged by a trolley wheel connected to another of the conductors and the bypath prescribed by the curved trolley wheel bypassing member associated with that trolley wheel.

15. As a trolley for trolley-fed vehicles, in combination with a supporting shaft mounted on the vehicle, a trolley head comprising a body provided with a number of trolley wheels to engage with feed lines and a number of curved trolley wheel bypassing members pivotally mounted for movement in the planes of the trolley wheels with ends capable of contacting the feed lines in engagement with the trolley wheels and provided with means normally maintaining the front ends of the curved trolley wheel bypassing members materially spaced from the feed lines, supporting means connecting pivotally the body with the supporting shaft and passing through one of the trolley wheels, and conductors connected to the trolley wheels, one of which conductors passes between the feed line engaged by a trolley wheel connected to another of the conductors and the bypath prescribed by the curved trolley wheel bypassing member associated with that trolley wheel.

HEINZ E. KALLMANN.